US011915465B2

(12) United States Patent
Gangeh et al.

(10) Patent No.: US 11,915,465 B2
(45) Date of Patent: Feb. 27, 2024

(54) APPARATUS AND METHODS FOR CONVERTING LINELESS TABLES INTO LINED TABLES USING GENERATIVE ADVERSARIAL NETWORKS

(71) Applicant: EYGS LLP, London (GB)

(72) Inventors: Mehrdad Jabbarzadeh Gangeh, Mountain View, CA (US); Hamid Reza Motahari-Nezad, Los Altos, CA (US)

( * ) Notice: Subject to any disclaimer, the term of this patent is extended or adjusted under 35 U.S.C. 154(b) by 1011 days.

(21) Appl. No.: 16/546,938

(22) Filed: Aug. 21, 2019

(65) Prior Publication Data

US 2021/0056429 A1  Feb. 25, 2021

(51) Int. Cl.
*G06V 10/82* (2022.01)
*G06V 10/44* (2022.01)
(Continued)

(52) U.S. Cl.
CPC .......... *G06V 10/454* (2022.01); *G06F 16/258* (2019.01); *G06N 3/045* (2023.01);
(Continued)

(58) Field of Classification Search
CPC ........ G06N 3/0454; G06N 3/088; G06N 3/02; G06N 3/044; G06N 3/0475; G06N 3/045; G06N 3/0464; G06N 3/0409; G06F 16/258; G06F 2113/10; G06F 30/27; G06F 16/182; G06F 16/2455; G06F 16/2462; G06F 16/27; G06F 16/583; G06F 18/24; G06F 16/538; G06F 18/214; G06F 9/451; G06F 9/5055; G06F 18/217; G06F 18/2413; G06F 8/34; G06F 8/38; G06F 11/302; G06F 11/3438; G06F 16/1824; G06F 16/1834; G06F 16/958; G06F 16/972; G06F 18/22;
(Continued)

(56) References Cited

U.S. PATENT DOCUMENTS 5,048,107 A  9/1991 Tachikawa
5,848,186 A  12/1998 Wang et al.
(Continued)

FOREIGN PATENT DOCUMENTS

AU  2018237196 A1 * 10/2019 ............. G06F 16/93
EP     2154631 A2 *  2/2010 ......... G06K 9/00624
(Continued)

OTHER PUBLICATIONS

Li et al.; "A GAN-based Feature Generator for Table Detection"; 2019 International Conference on Document Analysis and Recognition (ICDAR); Year: 2019; Conference Paper | Publisher: IEEE; Cited by: Papers (9) (Year: 2019).*
(Continued)

*Primary Examiner* — Binh C Tat
(74) *Attorney, Agent, or Firm* — COOLEY LLP

(57) ABSTRACT

A method for converting a lineless table into a lined table includes associating a first set of tables with a second set of tables to form a set of multiple table pairs that includes tables with lines and tables without lines. A conditional generative adversarial network (cGAN) is trained, using the table pairs, to produce a trained cGAN. Using the trained cGAN, lines are identified for overlaying onto a lineless table. The lines are overlaid onto the lineless table to produce a lined table.

17 Claims, 19 Drawing Sheets

100B

| 00clere 00tosses 00tracks 00receive | 010racle 01tier | 02NAMM 02sina 02lintels | 03PASTES 03Organic 03removed | 04Swine 04THAT |
|---|---|---|---|---|
| 10fellows | 11Before 11Spaces 11file | 12intern 12quart 12sharing | 13Fenton 13Report | 14gauged 14Pamir 14Bldg 14revert |
| 20kind | 21pleaded 21earning 21Returns 21oti | 22passed 22famil 22rock 22OPERATOR 22bank | 23mine | 24regi 24ster 24mast 24conmel 24CAREER |
| 30slat | 31stoles 31vested 31keen | 32carpet 32gates 32STORAGE | 33recede | 34buying 34doct 34figures |
| 40bearing 40boots 40senior 40LEFT 40tinting | 41flore 41absent 41sbaa 41belts | 42dolt 42aite | 43subpart | 44active 44Weud 44ning |
| 50RING 50rise | 51Pioneer | 52doorway 52FORCE 52layouts 52taller 52class | 53atit 53atca 53various 53walkway 53Gross | 54Index 54entity 54faster 54ONGOING 54tornado |
| 60pend 60nosed 60subpart | 61clerks | 62Average 62Prior 62SOWN 62Iran 62Mari | 63spek 63Written 63USED | 64Mali 64cairn 64Cools |
| 70Tams | 71MEANING 71muss | 72avoids | 73visitor 73amended 73cocon 73siet 73flow | 74eminent 74terror |

(51) Int. Cl.
*G06F 16/25* (2019.01)
*G06N 3/088* (2023.01)
*G06N 3/045* (2023.01)
*G06V 30/19* (2022.01)
*G06V 30/412* (2022.01)
*G06V 30/414* (2022.01)

(52) U.S. Cl.
CPC ............. *G06N 3/088* (2013.01); *G06V 10/82* (2022.01); *G06V 30/19173* (2022.01); *G06V 30/412* (2022.01); *G06V 30/414* (2022.01)

(58) Field of Classification Search
CPC .............. G06F 2111/14; G06F 2113/18; G06F 2201/865; G06F 3/011; G06F 30/39; G06F 16/2465; G06F 16/283; G06F 16/345; G06F 16/55; G06F 17/16; G06F 18/213; G06F 21/31; G06F 21/32; G06F 30/20; G06F 16/51; G06F 16/5854; G06F 16/953; G06F 17/18; G06F 18/2113; G06F 21/57; G06F 21/6218; G06F 21/6254; G06F 3/016; G06F 3/04847; G06F 30/13; G06F 30/392; G06F 40/253; G06F 40/30; G06F 9/3001; G06F 9/30036; G06F 9/34; G06F 9/3851; G06K 9/6271; G06V 10/82; G06V 10/454; G06V 30/412; G06V 30/414
USPC ........................... 706/120–130; 716/110–120
See application file for complete search history.

(56) References Cited

U.S. PATENT DOCUMENTS

| | | | |
|---|---|---|---|
| 5,892,843 A | 4/1999 | Zhou et al. | |
| 6,006,240 A | 12/1999 | Handley | |
| 6,735,748 B1 | 5/2004 | Teig et al. | |
| 6,757,870 B1 | 6/2004 | Stinger | |
| 7,283,683 B1 | 10/2007 | Nakamura et al. | |
| 7,548,847 B2 | 6/2009 | Acero et al. | |
| 8,165,974 B2 | 4/2012 | Privault et al. | |
| 8,731,300 B2 | 5/2014 | Rodriquez et al. | |
| 9,058,536 B1 | 6/2015 | Yuan et al. | |
| 9,172,842 B2 | 10/2015 | Booth et al. | |
| 9,235,812 B2 | 1/2016 | Scholtes | |
| 9,269,053 B2 | 2/2016 | Naslund et al. | |
| 9,342,892 B2 | 5/2016 | Booth et al. | |
| 9,348,815 B1 | 5/2016 | Estes et al. | |
| 9,703,766 B1 | 7/2017 | Kyre et al. | |
| 9,875,736 B2 | 1/2018 | Kim et al. | |
| 10,002,129 B1 | 6/2018 | D'Souza | |
| 10,062,039 B1 | 8/2018 | Lockett | |
| 10,241,992 B1 | 3/2019 | Middendorf et al. | |
| 10,614,345 B1 | 4/2020 | Tecuci et al. | |
| 10,810,709 B1* | 10/2020 | Tiyyagura .......... | H04N 1/00331 |
| 10,956,786 B2 | 3/2021 | Tecuci et al. | |
| 11,106,906 B2 | 8/2021 | Bassu et al. | |
| 11,113,518 B2 | 9/2021 | Chua et al. | |
| 11,625,934 B2 | 4/2023 | Tiyyagura et al. | |
| 11,715,313 B2 | 8/2023 | Chua et al. | |
| 2003/0097384 A1 | 5/2003 | Hu et al. | |
| 2006/0288268 A1 | 12/2006 | Srinivasan et al. | |
| 2007/0041642 A1 | 2/2007 | Romanoff et al. | |
| 2007/0050411 A1 | 3/2007 | Hull et al. | |
| 2010/0174975 A1 | 7/2010 | Mansfield et al. | |
| 2011/0249905 A1 | 10/2011 | Singh et al. | |
| 2012/0072859 A1 | 3/2012 | Wang et al. | |
| 2013/0191715 A1 | 7/2013 | Raskovic et al. | |
| 2014/0223284 A1 | 8/2014 | Rankin, Jr. et al. | |
| 2015/0058374 A1 | 2/2015 | Golubev et al. | |
| 2015/0093021 A1 | 4/2015 | Xu et al. | |
| 2015/0356461 A1 | 12/2015 | Vinyals et al. | |
| 2016/0078364 A1 | 3/2016 | Chiu et al. | |
| 2016/0104077 A1 | 4/2016 | Jackson, Jr. et al. | |
| 2016/0162456 A1 | 6/2016 | Munro et al. | |
| 2016/0350280 A1 | 12/2016 | Lavallee et al. | |
| 2016/0364608 A1 | 12/2016 | Sengupta et al. | |
| 2017/0083829 A1 | 3/2017 | Kang et al. | |
| 2017/0177180 A1 | 6/2017 | Bachmann et al. | |
| 2017/0235848 A1 | 8/2017 | Van Dusen et al. | |
| 2017/0300472 A1 | 10/2017 | Parikh et al. | |
| 2017/0300565 A1 | 10/2017 | Calapodescu et al. | |
| 2018/0060303 A1 | 3/2018 | Sarikaya et al. | |
| 2018/0068232 A1 | 3/2018 | Hari Haran et al. | |
| 2018/0129634 A1 | 5/2018 | Sivaji et al. | |
| 2018/0157723 A1 | 6/2018 | Chougule et al. | |
| 2018/0181797 A1 | 6/2018 | Han et al. | |
| 2018/0203674 A1 | 7/2018 | Dayanandan | |
| 2018/0204360 A1 | 7/2018 | Bekas et al. | |
| 2018/0260957 A1* | 9/2018 | Yang ....................... | G06T 7/143 |
| 2018/0336404 A1 | 11/2018 | Hosabettu et al. | |
| 2019/0049540 A1* | 2/2019 | Odry .................... | G01R 33/543 |
| 2019/0050381 A1 | 2/2019 | Agrawal et al. | |
| 2019/0108448 A1* | 4/2019 | O'Malia .............. | G06N 3/0472 |
| 2019/0147320 A1* | 5/2019 | Mattyus ............... | G06V 20/182 |
| | | | 382/155 |
| 2019/0171704 A1 | 6/2019 | Buisson et al. | |
| 2019/0228495 A1* | 7/2019 | Tremblay ............... | G06N 3/045 |
| 2019/0266394 A1 | 8/2019 | Yu et al. | |
| 2019/0303663 A1 | 10/2019 | Krishnapura et al. | |
| 2019/0340240 A1 | 11/2019 | Duta | |
| 2020/0005033 A1 | 1/2020 | Bellert | |
| 2020/0073878 A1 | 3/2020 | Mukhopadhyay et al. | |
| 2020/0089946 A1 | 3/2020 | Mallick et al. | |
| 2020/0151444 A1 | 5/2020 | Price et al. | |
| 2020/0151559 A1* | 5/2020 | Karras ................... | G06N 3/045 |
| 2020/0175267 A1 | 6/2020 | Schäfer et al. | |
| 2020/0250139 A1 | 8/2020 | Muffat et al. | |
| 2020/0250513 A1* | 8/2020 | Krishnamoorthy .... | G06N 3/048 |
| 2020/0265224 A1 | 8/2020 | Gurav et al. | |
| 2020/0327373 A1 | 10/2020 | Tecuci et al. | |
| 2020/0410231 A1 | 12/2020 | Chua et al. | |
| 2021/0064861 A1 | 3/2021 | Semenov | |
| 2021/0064908 A1 | 3/2021 | Semenov | |
| 2021/0073325 A1 | 3/2021 | Angst et al. | |
| 2021/0073326 A1 | 3/2021 | Aggarwal et al. | |
| 2021/0117668 A1 | 4/2021 | Zhong et al. | |
| 2021/0150338 A1 | 5/2021 | Semenov | |
| 2021/0150757 A1* | 5/2021 | Mustikovela .......... | G06V 20/56 |
| 2021/0165938 A1* | 6/2021 | Bailey .................... | G06N 3/084 |
| 2021/0166016 A1 | 6/2021 | Sun et al. | |
| 2021/0166074 A1 | 6/2021 | Tecuci et al. | |
| 2021/0233656 A1* | 7/2021 | Tran ...................... | A61B 5/7267 |
| 2021/0240976 A1* | 8/2021 | Tiyyagura ............ | G06V 30/414 |
| 2021/0365678 A1 | 11/2021 | Chua et al. | |
| 2022/0027740 A1* | 1/2022 | Dong ..................... | G06F 40/103 |
| 2022/0058839 A1* | 2/2022 | Chang .................... | G06T 11/00 |
| 2022/0148242 A1* | 5/2022 | Russell ................ | G06N 3/0454 |
| 2023/0237828 A1 | 7/2023 | Tiyyagura et al. | |

FOREIGN PATENT DOCUMENTS

| | | | |
|---|---|---|---|
| EP | 3742346 A2 * | 11/2020 | ............. G06F 17/18 |
| WO | WO-2017163230 A1 * | 9/2017 | ......... G06F 16/5846 |
| WO | WO-2018175686 A1 | 9/2018 | |

OTHER PUBLICATIONS

International Search Report and Written Opinion for International Application No. PCT/US2020/027916, dated Jul. 21, 2020, 16 pages.
Office Action for U.S. Appl. No. 16/790,945, dated Jul. 29, 2020, 13 pages.
International Search Report and Written Opinion for International Application No. PCT/US2020/046820, dated Nov. 11, 2020, 13 pages.
Office Action for U.S. Appl. No. 16/456,832, dated Nov. 6, 2020, 18 pages.
Oliveira, H. et al., "Assessing shallow sentence scoring techniques and combinations for single and multi-document summarization," Expert Systems With Applications, vol. 65 (Dec. 2016) pp. 68-86.

(56) References Cited

OTHER PUBLICATIONS

Qasim, S. R. et al., "Rethinking Table Parsing using Graph Neural Networks," 2019 International Conference on Document Analysis and Recognition (ICDAR), Sydney, Australia, 2019, pp. 142-147.
Le Vine, N. et al., "Extracting tables from documents using conditional generative adversarial networks and genetic algorithms," IJCNN 2019 International Joint Conference on Neural Networks, Budapest, Hungary, Jul. 14-19, 2019, pp. 1-8.
Office Action for U.S. Appl. No. 16/382,707, dated Sep. 4, 2019, 11 pages.
Babatunde, F. F. et al., "Automatic Table Recognition and Extraction from Heterogeneous Documents," Journal of Computer and Communications, vol. 3, pp. 100-110 (Dec. 2015).
Dong, C. et al., "Image Super-Resolution Using Deep Convolutional Networks," arXiv: 1501.00092v3 [cs.CV], Jul. 31, 2015, Retrieved from the Internet: <URL: https://arxiv.org/pdf/1501.00092.pdf>, 14 pages.
Dong, R. et al., "Multi-input attention for unsupervised OCR correction," Proceedings of the 56th Annual Meetings of the Association for Computational Linguistics (Long Papers), Melbourne, Australia, Jul. 15-20, 2018, pp. 2363-2372.
Kharb, L. et al., "Embedding Intelligence through Cognitive Services," International Journal for Research in Applied Science & Engineering Technology (IJRASET), ISSN: 2321-9653; IC Value: 45.98; SJ Impact Factor:6.887, vol. 5, Issue XI, Nov. 2017, pp. 533-537.
Paladines, J. et al., "An Intelligent Tutoring System for Procedural Training with Natural Language Interaction," Conference Paper, DOI: 10.5220/0007712203070314, Jan. 2019, 9 pages.
Howard, J. et al., "Universal Language Model Fine-tuning for Text Classification," arXiv:1801.06146v5 [cs.CL], May 23, 2018, Retrieved from the Internet: <URL: https://arxiv.org/pdf/1801.06146.pdf>, 12 pages.
Mac, A. J. et al., "Locating tables in scanned documents for reconstructing and republishing," arXiv:1412.7689 [cs.CV], Dec. 2014, The 7th International Conference on Information and Automation for Sustainability (ICIAfS) 2014, 6 pages.
Kasar, T. et al., "Learning to Detect Tables in Scanned Document Images Using Line Information," ICDAR '13: Proceedings of the 2013 12th International Conference on Document Analysis and Recognition, Aug. 2013, Washington, DC, pp. 1185-1189.
Isola, P. et al., "Image-to-Image Translation with Conditional Adversarial Networks," arXiv: 1611.07004v3 [cs.CV] Nov. 26, 2018, Retrieved from the Internet: <URL: https://arxiv.org/pdf/1611.07004.pdf>, 17 pages.
Klampfl, S. et al., "A Comparison of Two Unsupervised Table Recognition Methods from Digital Scientific Articles," D-Lib Magazine, vol. 20, No. 11/12, Nov./Dec. 2014, DOI:10.1045/november14-klampfl, 15 pages.
Fan, M. et al., "Detecting Table Region in PDF Documents Using Distant Supervision," arXiv: 1506.08891v6 [cs.CV], Sep. 22, 2015, Retrieved from the Internet: <URL: https://arxiv.org/pdf/1506.08891v6.pdf>, 7 pages.
Pinto, D. et al., "Table extraction using conditional random fields," Proceedings of the 26th Annual International ACM SIGIR Conference on Research and Development in Information Retrieval (SIGIR '03), ACM, New York, NY, USA, pp. 235-242. DOI=http://dx.doi.org/10.1145/860435.860479 (2003), 8 pages.
Hanifah, L. et al., "Table Extraction from Web Pages Using Conditional Random Fields to Extract Toponym Related Data," Journal of Physics: Conference Series, vol. 801, Issue 1, Article ID 012064, Jan. 2017, 8 pages.
Staar, P. W. J. et al., "Corpus conversion service: A machine learning platform to ingest documents at scale," Applied Data Science Track Paper, KDD 2018, Aug. 19-23, 2018, London, United Kingdom, pp. 774-782.
Handley, J. C., "Table analysis for multi-line cell identification," Proceedings of SPIE, vol. 4307, Jan. 2001, pp. 34-43.

Vincent, P. et al., "Extracting and composing robust features with denoising autoencoders," in Proceedings of the 25th International Conference on Machine Learning, Helsinki, Finland, 2008, 8 pages.
Mao, X-J. et al., "Image Restoration Using Very Deep Convolutional Encoder-Decoder Networks with Symmetric Skip Connections," 30th Conference on Neural Information Processing Systems (NIPS 2016), Barcelona, Spain, Retrieved from the Internet: <URL: https://papers.nips.cc/paper/6172-image-restoration-using-very-deep-convolutional-encoder-decoder-networks-with-symmetric-skip-connections.pdf>, 9 pages.
Mao, X-J. et al., "Image Restoration Using Convolutional Autoencoders with Symmetric Skip Connections," arXiv:1606.08921v3 [cs.CV], Aug. 30, 2016, Retrieved from the Internet: <URL: https://arxiv.org/abs/1606.08921>, 17 pages.
Lehtinen, J. et al., "Noise2Noise: Learning Image Restoration without Clean Data," Proceedings of the 35th International Conference on Machine Learning, Stockholm, Sweden, PMLR 80, Jul. 10-15, 2018, Retrieved from the Internet: <URL: http://proceedings.mlr.press/v80/lehtinen18a/lehtinen18a.pdf>, 10 pages.
Schreiber, S. et al., "DeepDeSRT: Deep Learning for Detection and Structure Recognition of Tables in Document Images," 2017 14th IAPR International Conference on Document Analysis and Recognition (ICDAR) Nov. 9-15, 2017, Retrieved from the Internet: <https://www.dfki.de/fileadmin/user_upload/import/9672_PID4966073.pdf>, 6 pages.
Kavasidis, I. et al., "A Saliency-based Convolutional Neural Network for Table and Chart Detection in Digitized Documents," arXiv.1804.06236v1 [cs.CV], Apr. 17, 2018, Retrieved from the Internet: < URL: https://arxiv.org/pdf/1804.06236.pdf>, 13 pages.
Xiang, R. Research Statement, Aug. 2018, 6 pages.
Harit, G. et al., "Table Detection in Document Images using Header and Trailer Patterns," ICVGIP '12, Dec. 16-19, 2012, Mumbai, India, 8 pages.
Notice of Allowance for U.S. Appl. No. 16/781,195, dated Feb. 1, 2023, 10 pages.
Sun, N., et al., "Faster R-CNN Based Table Detection Combining Corner Locating," 2019 International Conference on Document Analysis and Recognition (ICDAR), 2019, pp. 1314-1319.
Eskenazi, S. et al., A comprehensive survey of mostly textual document segmentation algorithms since 2008, Pattern Recognition, vol. 64, Apr. 2017, pp. 1-14.
Gangeh, M. J. et al., "Document enhancement system using autoencoders," 33rd Conference on Neural Information Processing Systems (NeurIPS 2019), Vancouver, Canada, Nov. 2019, Retrieved from the Internet:: URL:https://openreview.net/pdf?id=S1Mnzp9qLB, 4 pages.
Hakim, S. M. A. et al., "Handwritten bangla numeral and basic character recognition using deep convolutional neural network," 2019 International Conference on Electrical, Computer and Communication Engineering (ECCE), IEEE, Feb. 7-9, 2019, 6 pages.
International Search Report and Written Opinion for International Application No. PCT/EP2020/076042, dated Jan. 12, 2021, 11 pages.
International Search Report and Written Opinion for International Application No. PCT/EP2021/052579, dated May 10, 2021, 15 pages.
International Search Report and Written Opinion for International Application No. PCT/US2020/039611, dated Oct. 13, 2020, 12 pages.
Kise, K. et al., "Segmentation of Page Images Using the Area Voronoi Diagram," Computer Vision and Image Understanding, vol. 70, No. 3, Jun. 1998, pp. 370-382.
Office Action for U.S. Appl. No. 16/781,195, dated Jun. 8, 2022, 29 pages.
Office Action for U.S. Appl. No. 16/781,195, dated Nov. 26, 2021, 26 pages.
Ohta, M. et al., "A cell-detection-based table-structure recognition method," Proceedings of the ACM Symposium on Document Engineering 2019, pp. 1-4.
Oro, E. et al., "PDF-TREX: An approach for recognizing and extracting tables from PDF documents," 2009 10th International Conference on Document Analysis and Recognition, pp. 906-910, IEEE, 2009.

(56) References Cited

OTHER PUBLICATIONS

Paliwal, Shubham Singh, D. Vishwanath, Rohit Rahul, Monika Sharma, and Lovekesh Vig. "Tablenet: Deep learning model forend-to-end table detection and tabular data extraction from scanned document images." International Conference on Document Analysis and Recognition (ICDAR), pp. 128-133. IEEE, 2019. (Year: 2019).

Pellicer, J. P., "Neural networks for document image and text processing," PhD Thesis, Universitat Politecnica de Valencia, Sep. 2017, 327 pages.

Rashid, Sheikh Faisal, Abdullah Akmal, Muhammad Adnan, Ali Adnan Aslam, and Andreas Dengel. "Table recognition inu heterogeneous documents using machine learning." In 2017 14th IAPR International conference on document analysis and recognition (ICDAR), vol. 1, pp. 777-782. IEEE, 2017. (Year: 2017).

Wiraatmaja, C. et al., "The Application of Deep Convolutional Denoising Autoencoder for Optical Character Recognition Preprocessing," 2017 International Conference on Soft Computing, Intelligent System and Information Technology (ICSIIT), IEEE, Sep. 2017, pp. 72-77.

Xiao, Y. et al., "Text region extraction in a document image based on the Delaunay tessellation," Pattern Recognition, vol. 36, No. 3, Mar. 2003, pp. 799-809.

Non-Final Office Action for U.S. Appl. No. 18/172,461 dated Jun. 20, 2023, 9 pages.

Deivalakshmi, S. et al., "Detection of Table Structure and Content Extractions from Scanned Documents," 2014 International Conference on Communication and Signal Processing, 2014, pp. 270-274.

\* cited by examiner

| | | | | | |
|---|---|---|---|---|---|
| 00clete 00tosses 00racks 00receive | 01Oracle 01tier | 02NAMM 02sina 02lintels | 03PASTES 03Organic 03removed | 04Swine 04THAT | |
| 10fellows | 11Before 11Spaces 11file | 12intern 12quari 12sharing | 13Fenton 13Report | 14gauged 14Pamir 14Bldg 14revert | |
| 20kind | 21pleaded 21earning 21Returns 21ofi | 22passed 22famil 22rock 22OPERATOR 22thank | 23mime | 24regi 24ster 24mast 24connel 24CAREER | |
| 30slat | 31stoles 31vested 31keen | 32carpet 32gates 32STORAGE | 33recede | 34buying 34doet 34figures | |
| 40bearing 40boots 40senior 40LEFT 40hinting | 41flore 41absent 41shaa 41belts | 42dolt 42aite | 43subpart | 44active 44Wend 44ning | |
| 50RING 50rise | 51Pioneer | 52doorway 52FORCE 52layouts 52taller 52class | 53atit 53atea 53various 53walkway 53Gross | 54Index 54entity 54faster 54ONGOING 54tornado | |
| 60pend 60nosed 60subpart | 61clerks | 62Average 62Prior 62SOWN 62Iran 62Mari | 63spek 63Written 63USED | 64Mali 64cairn 64Coots | |
| 70Tams | 71MEANING 71muss | 72avoids | 73visitor 73amended 73coon 73slet 73flow | 74eminent 74error | |

| | | | | |
|---|---|---|---|---|
| 00clete 00tosses 00racks 00receive | 01Oracle 01tier | 02NAMM 02sina 02lintels | 03PASTES 03Organic 03removed | 04Swine 04THAT |
| 10fellows | 11Before 11Spaces 11file | 12intern 12quart 12sharing | 13Fenton 13Report | 14gauged 14Pamir 14Bldg 14revert |
| 20kind | 21pleaded 21earning 21Returns 21ofi | 22passed 22famil 22rock 22OPERATOR 22thank | 23mime | 24regi 24ster 24mast 24conmel 24CAREER |
| 30slat | 31stoles 31vested 31keen | 32carpet 32gates 32STORAGE | 33recede | 34buying 34doet 34figures |
| 40bearing 40boots 40senior 40LEFT 40tinting | 41flore 41absent 41shaa 41belts | 42dolt 42aite | 43subpart | 44active 44Wend 44ning |
| 50RING 50rise | 51Pioneer | 52doorway 52FORCE 52layouts 52taller 52class | 53atii 53atea 53various 53walkway 53Gross | 54Index 54entity 54faster 54ONGOING 54tornado |
| 60pend 60nosed 60subpart | 61clerks | 62Average 62Prior 62SOWN 62Iran 62Mari | 63spek 63Written 63USED | 64Mali 64cairn 64Coots |
| 70Tams | 71MEANING 71muss | 72avoids | 73visitor 73amended 73coon 73slet 73flow | 74eminent 74terror |

| | | | | |
|---|---|---|---|---|
| 00clete 00tosses 00racks 00receive | 01Oracle 01tier | 02NAMM 02sina 02lintels | 03PASTES 03Organic 03removed | 04Swine 04THAT |
| 10fellows | 11Before 11Spaces 11file | 12intern 12quart 12sharing | 13Fenton 13Report | 14gauged 14Pamir 14Bldg 14revert |
| 20kind | 21pleaded 21earning 21Returns 21ofi | 22passed 22famil 22rock 22OPERATOR 22thank | 23mime | 24regi 24ster 24mast 24conmel 24CAREER |
| 30slat | 31stoles 31vested 31keen | 32carpet 32gates 32STORAGE | 33recede | 34buying 34doet 34figures |
| 40bearing 40boots 40senior 40LEFT 40inting | 41flore 41absent 41shaa 41belts | 42dolt 42aite | 43subpart | 44active 44Wend 44ning |
| 50RING 50rise | 51Pioneer | 52doorway 52FORCE 52layouts 52taller 52class | 53atit 53atea 53various 53walkway 53Gross | 54Index 54entity 54faster 54ONGOING 54tornado |
| 60pend 60nosed 60subpart | 61clerks | 62Average 62Prior 62SOWN 62Iran 62Mari | 63spek 63Written 63USED | 64Mali 64cairn 64Coots |
| 70Tams | 71MEANING 71muss | 72avoids | 73visitor 73amended 73coon 73slet 73flow | 74eminent 74terror |

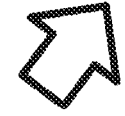

| | | | | |
|---|---|---|---|---|
| 00clete 00tosses 00racks 00receive | 01Oracle 01tier | 02NAMM 02sina 02lintels | 03PASTES 03Organic 03removed | 04Swine 04THAT |
| 10fellows | 11Before 11Spaces 11file | 12intern 12quart 12sharing | 13Fenton 13Report | 14gauged 14Pamir 14Bldg 14revert |
| 20kind | 21pleaded 21earning 21Returns 21ofi | 22passed 22famil 22rock 22OPERATOR 22thank | 23mime | 24regi 24ster 24mast 24conmel 24CAREER |
| 30slat | 31stoles 31vested 31keen | 32carpet 32gates 32STORAGE | 33reede | 34buying 34doet 34figures |
| 40hearing 40boots 40senior 40LEFT 40tinting | 41flore 41absent 41shaa 41belts | 42dolt 42aite | 43subpart | 44active 44Wend 44ning |
| 50RING 50rise | 51Pioneer | 52doorway 52FORCE 52layouts 52taller 52class | 53ait 53atea 53various 53walkway 53Gross | 54Index 54entity 54faster 54ONGOING 54tornado |
| 60pend 60nosed 60subpart | 61clerks | 62Average 62Prior 62SOWN 62Iran 62Mari | 63spek 63Written 63USED | 64Mali 64cairn 64Coots |
| 70Tans | 71MEANING 71muss | 72avoids | 73visitor 73amended 73coon 73slet 73flow | 74eminent 74terror |

| | | | |
|---|---|---|---|
| 00clete 00tosses 00racks 00receive | 01Oracle 01tier | 02NAMM 02sina 02lintels | 03PASTES 03Organic 03removed | 04Swine 04THAT |
| 10fellows | 11Before 11Spaces 11file | 12interm 12quari 12sharing | 13Fenton 13Report | 14gauged 14Pamir 14Bldg 14revert |
| 20kind | 21pleaded 21earning 21Returns 21ofi | 22passed 22famil 22rock 22OPERATOR 22thank | 23mime | 24regi 24ster 24mast 24conmel 24CAREER |
| 30slat | 31stoles 31vested 31keen | 32carpet 32gates 32STORAGE | 33recede | 34buying 34doet 34figures |
| 40bearing 40boots 40senior 40LEFT 40tinting | 41flore 41absent 41shaa 41belts | 42dolt 42aite | 43subpart | 44active

Input

00Lariat 00years
00LOWS 00PASSED  01Local 01arama    02frame 02vested
00foam

10eddied 10demi     11prying 11loss
10noise 10Name      11ANYTHING        12RANCHO 12walkways
10mislead           11whish 11salve   12guides 20creates           21guage 21Rubbish  22eights 22coed 22slander 30redraft 306oe
30feell 30Zone      31Hark             33duet 32glare
30Dates 41DESTIN 41slew
40eout 40Suds       41XXXVI 41braced   42pith 42COMPLY 50subject           51dumped           52stocked 52ame 52sand 00foams 00courts   01Wane 01heavy    02equity 02SLAIN
00nullify 00dotty  01Menem 01Joann   02Union 02climate    03Flaw 03This 03antis   04payable 04obscene
00arcade           01rust             02lived              03weekend               04NOON 04mote 10normal           11null 11tunnel   12wort 12Bent 12warm  13donated 13Amounts    14Laced
                                                           13unions 23XXIII 23furnish
                   21prio 21forum    22larger 22Rich      23ANTS 23Valley        24initial 24seizure
20Painted          21THERE 21raised  22SOLE 22Lord 22skill 32Imes                 24Terim 24push

FIG. 9A

Output

| | | |
|---|---|---|
| 00Lariat 00years 00LOWS 00PASSED 00foam | 01Local 01arama | 02frame 02vested |
| 10eddies 10demi 10noise 10Name 10enlisted | 11prying 11loss 11ANYTHING 11whish 11salve | 12RANCHO 12walkways 12guides |
| 20creates | 21guage 21Rubbish | 22eights 22coed 22slander |
| 30redraft 30boe 30feell 30Zone 30Dates | 31Hark | 32duet 32glare |
| 40eout 40Suds | 41DESTIN 41slew 41XXXVI 41braced | 42pith 42COMPLY |
| 50subject | 51dumped | 52stocked 52ame 52sand |

| | | | | |
|---|---|---|---|---|
| 00foams 00courts 00nullify 00dotty 00arcade | 01Wane 01heavy 01Menera 01Joann 01rust | 02equity 02SLAIN 02Union 02climate 02lived | 03Flaw 03This 03antis 03weekend | 04payable 04obscene 04NOON 04mote |
| 10normal | 11cull 11tunnel | 12wort 12Bent 12warn | 13donated 13Amounts 13unions | 14Laced |
| 20Painted | 21prio 21forum 21THERE 21raised | 22larger 22Rich 22SOLE 22Lord 22skill | 23XXIII 23furnish 23ANTS 23Valley 23Imes | 24initial 24seizure 24Terim 24push |

FIG. 9B

Ground Truth

| | | |
|---|---|---|
| 00Lariat 00yeas 00LOWS 00PASSED 00foam | 01Local 01arama | 02frame 02vested |
| 10eddies 10demi 10noise 10Name 10enlisted | 11prying 11loss 11ANYTHING 11whish 11salve | 12RANCHO 12walkways 12guides |
| 20creates | 21guage 21Rubbish | 22eights 22coed 22slander |
| 30redraft 30boe 30feell 30Zone 30Dates | 31Hark | 32duet 32glare |
| 40eout 40Suds | 41DESTIN 41slew 41XXXVI 41braced | 42pith 42COMPLY |
| 50subject | 51dumped | 52stocked 52ame 52sand |

| | | | | |
|---|---|---|---|---|
| 00foams 00courts 00nullify 00dotty 00arcade | 01Wane 01heavy 01Menera 01Joann 01rust | 02equity 02SLAIN 02Union 02climate 02lived | 03Flaw 03This 03antis 03weekend | 04payable 04obscene 04NOON 04mote |
| 10normal | 11cull 11tunnel | 12wort 12Bent 12warn | 13donated 13Amounts 13unions | 14Laced |
| 20Painted | 21prio 21forum 21THERE 21raised | 22larger 22Rich 22SOLE 22Lord 22skill | 23XXIII 23furnish 23ANTS 23Valley 23Imes | 24initial 24seizure 24Terim 24push |

FIG. 9C

Input

| | | | | |
|---|---|---|---|---|
| 00Jester | 01earn 01bags 01Fit<br>02Real 00Agent | 40Piper 40vice<br>40Late 40Roads | 00lead | 00LEASED 00prone 00ate |
| 10GLAZING<br>10cms 11hostd<br>10bardst<br>10Casts | 11Nice 11Low | 12Fume<br>12boarders<br>12Games 12Bias<br>12Read | 13tafts 13mindset<br>13arrives | 13Outs 13Babe<br>13CLAIMING 13Genes |
| 20tun 20Output | 21Place 21OFFER<br>20Lattice | 25Fore 25LEASE | 12wild 10Creole<br>12laird | 21Frost 22Leap 25Letters<br>20bottle 21Piers |
| 10cern 30roduct | 30Prez 11bing 11ietard | 25Burn 22Sear<br>25Fridge 26Dutchs | 33Texts 32Biscuit<br>33Mach | 52Ortez |
| 40Nune<br>40velocity<br>40tonal 40least<br>40THEIR | 40party 40lace 41hoax<br>40Deter 40Broken | 13Frosts | 40BASE 43bucks<br>43parted 42web | 41lack 47Land |
| 50Piece<br>30explicit 30least<br>80Broad | 50lease 50Cola 51lasts<br>50Dome 50Burn | 53lock 53Ego<br>52Bias 58City<br>51Blocked | 52base 52YOUR<br>50DESIRES | 56Die 49mental 51Degree<br>52Art |
| 00Ongoing | 62Alter 61Aside 61Arbor<br>63Bravo | 61Loe | 62Heap | 62Est 64harp 65iazer<br>64Balm 64TACOMA |

| | | | | |
|---|---|---|---|---|
| 00Wail 00warn 00Cooling | 01backs 01fusible 01boon<br>01MUSE 01stack | 02shampoo 02hinged | | 03nights 03Surety 03shich |
| 10because 10EXTENT<br>10olla 10Jlve 10catl | 11gnaw 11perf 11aral<br>11DENNY 11cfl | 12Hundred 12subl 12flub | | 13futon 13mead<br>13CONTAINS |

FIG. 10A

Output

| | | | | |
|---|---|---|---|---|
| 00Jester | 01earn 01bags 01Fit 02Real 00Agent | 40Piper 40vice 40Late 40Roads | 00lead | 00LEASED 00prone 00ate |
| 10GLAZING 10cms 11hostd 10bardst 10Casts | 11Nice 11Low | 12Fume 12boarders 12Games 12Bias 12Read | 13tafts 13mindset 13arrives | 13Outs 13Babe 13CLAIMING 13Genes |
| 20tun 20Output 10cern 30roduct | 21Place 21OFFER 20Lattice 30Prez 11bing 11letard | 25Fore 25LEASE 25Burn 22Sear 25Fridge 26Dutchs | 12wild 10Creole 12laird 33Texts 32Biscuit 33Mach | 21Frost 22Leap 25Letters 20bottle 21Piers 52Ortez |
| 40Nune 40velocity 40tonal 40least 40THEIR | 40party 40iace 41hoax 40Deter 40Broken | 13Frosts | 40BASE 43bucks 43parted 42web | 41lack 47Land |
| 50Piece 30explicit 30least 80Broad | 50lease 50Cola 51lasts 50Dome 50Burn | 53lock 53Ego 52Bias 58City 51Blocked | 52base 52YOUR 50DESIRES | 56Die 49mental 51Degree 52Art |
| 00Ongoing | 62Alter 61Aside 61Arbor 63Bravo | 61Loe | 62Heap | 62Est 64harp 65lazer 64Balm 64TACOMA |

| | | | |
|---|---|---|---|
| 00Wail 00warn 00Cooling | 01backs 01fusible 01boon 01MUSE 01stack | 02shampoo 02hinged | 03nights 03Surety 03shich |
| 10because 10EXTENT 10olla 10Jive 10catl | 11gnaw 11perf 11aral 11DENNY 11ofl | 12Hundred 12subl 12flub | 13futon 13mead 13CONTAINS |

FIG. 10B

Ground Truth

| | | | | |
|---|---|---|---|---|
| 00Jester | 01earn 01bags 01Fit 02Real 00Agent | 40Piper 40vice 40Late 40Roads | 00lead | 00LEASED 00prone 00ate |
| 10GLAZING 10cms 11hostd 10bardst 10Casts | 11Nice 11Low | 12Fume 12boarders 12Games 12Bias 12Read | 13tafts 13mindset 13arrives | 13Outs 13Babe 13CLAIMING 13Genes |
| 20tun 20Output | 21Place 21OFFER 20Lattice | 25Fore 25LEASE | 12wild 10Creole 12laird | 21Frost 22Leap 25Letters 20bottle 21Piers |
| 10cern 30roduct | 30Prez 11bing 11letard | 25Burn 22Sear 25Fridge 26Dutchs | 33Texts 32Biscuit 33Mach | 52Ortez |
| 40Nune 40velocity 40tonal 40least 40THEIR | 40party 40ace 41hoax 40Deter 40Broken | 13Frosts | 40BASE 43bucks 43parted 42web | 41lack 47Land |
| 50Piece 30explicit 30least 80Broad | 50lease 50Cola 51lasts 50Dome 50Burn | 53lock 53Ego 52Bias 58City 51Blocked | 52base 52YOUR 50DESIRES | 56Die 49mental 51Degree 52Art |
| 00Ongoing | 62Alter 61Aside 61Arbor 63Bravo | 61Loe | 62Heap | 62Est 64harp 65lazer 64Balm 64TACOMA |

| | | | |
|---|---|---|---|
| 00Wail 00warn 00Cooling | 01backs 01fusible 01boon 01MUSE 01stack | 02shampoo 02hinged | 03nights 03Surety 03shich |
| 10because 10EXTENT 10olla 10Jive 10catl | 11gnaw 11perf 11aral 11DENNY 11ofl | 12Hundred 12subl 12flub | 13futon 13mead 13CONTAINS |

FIG. 10C

APPARATUS AND METHODS FOR CONVERTING LINELESS TABLES INTO LINED TABLES USING GENERATIVE ADVERSARIAL NETWORKS

TECHNICAL FIELD

The present disclosure generally relates to the detection of a table structure within an electronic file, and in particular, the conversion of a lineless table into a lined table.

BACKGROUND

Tables are compact, efficient tools for summarizing relational information and are used in a wide variety of documents such as forms, invoices, scientific papers, newspaper articles, etc. Although the human eye can readily perceive a table within a text document, the automated/computer-based detection and understanding of tables remains challenging to implement.

SUMMARY

In some embodiments, a method for converting a lineless table into a lined table includes associating a first set of tables with a second set of tables to form a plurality of table pairs that includes tables with lines and tables without lines. A conditional generative adversarial network (cGAN) is trained, using the plurality of table pairs, to produce a trained cGAN. Using the trained cGAN, a plurality of lines are identified for overlaying onto a lineless table. The plurality of lines are overlaid onto the lineless table to produce a lined table.

In some embodiments, a method for converting a lineless table into a lined table includes generating training data via a processor. The training data includes a first dataset with at least one of lineless formatted data or partially lined formatted data, and a second dataset with formatted data with format lines, the second dataset being associated with the first dataset. An artificial neural network (ANN) is trained using the training data based on at least one of a local visual structure or a global visual structure of the training data, to produce a trained ANN configured to predict line placement for at least one of a lineless table or a partially lined table.

In some embodiments, a system for converting a lineless table into a lined table includes a processor and a memory storing instructions executable by the processor. The instructions include instructions to receive a first table that is one of a lineless table or a partially lined table. The instructions also include instructions to generate a second table that is a lined table based on the first table and using a trained neural network model that predicts line placement based on structural attributes of the first table.

BRIEF DESCRIPTION OF THE DRAWINGS

FIGS. 5A-5C are diagrams showing an inverted graphical representation of text regions of a lined and lineless table, according to some embodiments.

FIGS. 9A-9C are diagrams showing a first example set of results from converting a lineless table into a lined table, according to some embodiments.

FIGS. 10A-10C are diagrams showing a second example set of results from converting a lineless table into a lined table, according to some embodiments.

DETAILED DESCRIPTION

Figure 1:
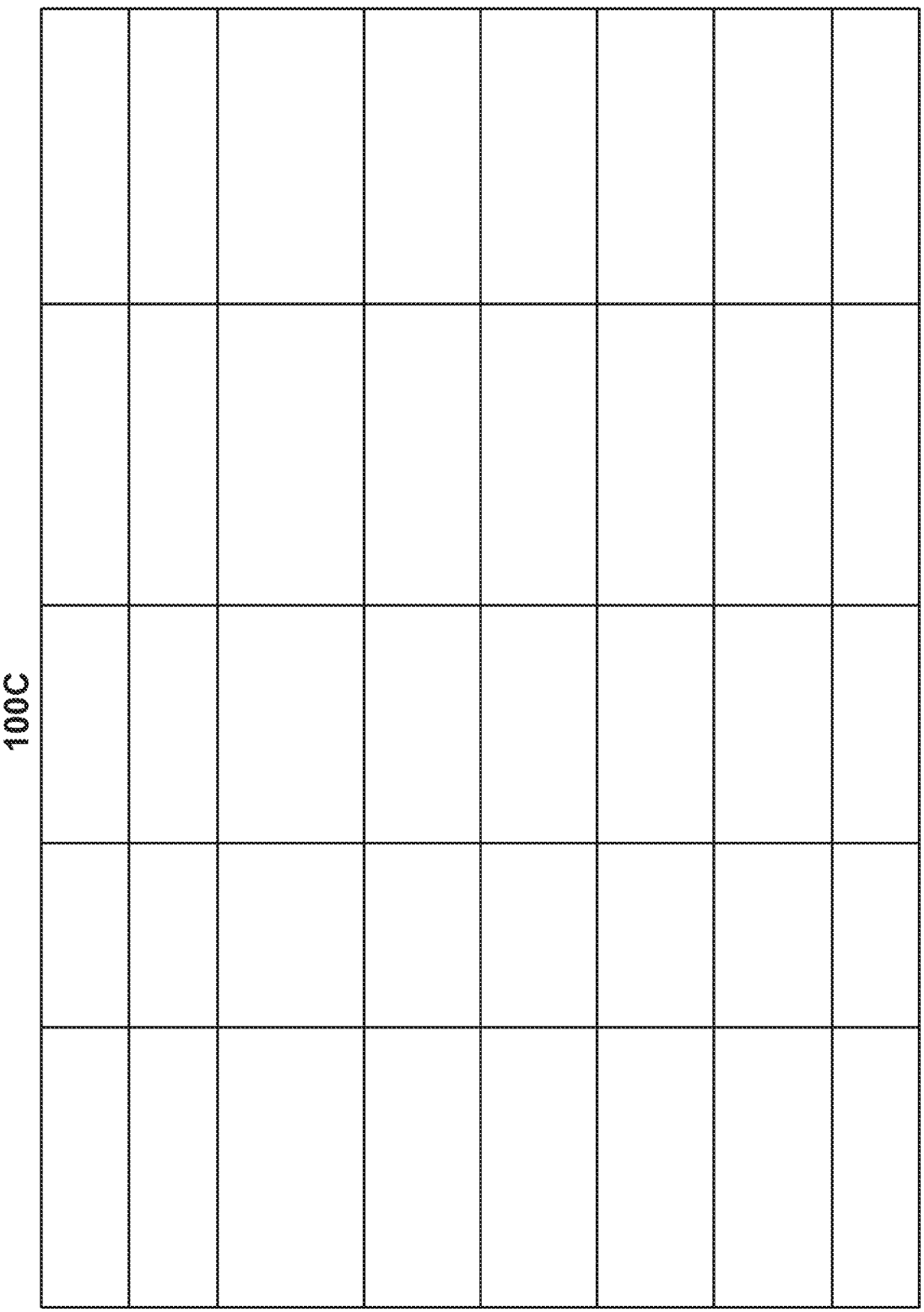
FIGS. 1A-1D are diagrams illustrating a method of detecting table structure for a lineless table, according to some embodiments.

Documents such as leases, invoices, and schedules (e.g., Schedule K-1) often include tables that do not have horizontal and/or vertical lines. Without these lines to separate the table cells, known algorithms for extracting information from tables, which typically rely on the presence of semantic tags or other formatting cues, can fail to accurately extract the information. Known multiresolution techniques/algorithms can also include several feature-engineered steps that are performed sequentially, and as such, can suffer from inefficiencies cause by error propagation between the sequential steps. For example, (1) one or more known multiresolution approaches (such as wavelets) can be used to estimate an overall structure of a lineless or partially lined table, and (2) lines can subsequently be generated based on the estimated structure of the table. Such approaches, however involve multiple steps and are prone to error propagation between the steps. Moreover, no known methods exist for predicting the placement of lines in lineless or partially lined tables based on their visual structure.

Methods of the present disclosure address the foregoing issues by performing multiple tasks (such as steps (1) and (2) described above) in a single step (e.g., a training step), in an end-to-end manner, such that error propagation between multiple steps is reduced or eliminated. As used herein, "end-to-end" describes a process that directly maps an input data (e.g., a table without lines or with partial lines) to an output prediction (e.g., the predicted lines in the input table), bypassing the intermediate step(s) typically used in a traditional approach. Some embodiments set forth herein can predict horizontal and/or vertical lines for a table lacking such lines, based on the overall visual structure of the table and using artificial intelligence (AI) methods such as artificial neural network-based deep learning. The table cells can then be identified, resulting in faster, more efficient and more accurate extraction of data from the table (particularly when applied to automated data extraction), as compared with known automated data extraction approaches. Data extraction techniques compatible with the resulting, lined table can include optical character resolution (OCR), Huffman Transforms, graphical-based methods, etc.

In some embodiments, entries are detected in a table that does not have lines (e.g., boundary lines, elongate graphical features, contour lines, lines between adjacent rows, and/or lines between adjacent columns). Training data is generated by obtaining sample tables and forming one version with lines and one version without lines. The training data is then used to train a conditional generative adversarial network (cGAN). In use, when a table without lines is to be processed, the trained cGAN produces a version of the table with the lines added, making subsequent text extraction more effective.

In some embodiments, an algorithm based on one or more multiscale deep generative adversarial networks/models is used to predict line placement for a lineless table based on its visual structure. The predicted lines are superimposed on the lineless table to produce a lined table. The algorithm can be executed in both a "global scale" (i.e., using global structural features of the table) and a "local scale" (i.e., using local structural features of the table) when identifying or predicting lines for separating rows and/or columns, resulting in highly accurate line prediction. Global structures of a table and local structures of a table can be taken into consideration, for example, using kernels of varying size in a convolutional network (which can be part of one or more generative and/or adversarial networks in the cGAN). According to some embodiments set forth herein, atrous convolution is used for multiresolution analysis and estimation of both global and local structures in a table. Use of the algorithm is preceded by a training phase, for example where the algorithm includes a cGAN. The cGAN is trained, for example, to accomplish supervised image-to-image translation, in which pairs of tables are generated based on an initial, lined table. Lines of the lined table are detected and removed, for example using morphological operators, to produce a corresponding lineless table. In other embodiments, a GAN is trained in an unsupervised manner, with the training input being an image, and using both lined and lineless tables that are not paired. In some embodiments, the prediction of line placement for lineless tables is performed according to a method that is not "rule based."

As used herein, a "lineless table" refers to tabular data (i.e., text-based data/information that is arranged in rows and columns or any other organized arrangement) that either does not include any lines or other graphical features (e.g., dividers, symbols, differences in font, etc.) that serve as a "guide to the eye" and to demarcate boundaries between rows, columns, or other sub-section of the arranged data. A "lineless table" can also refer to tabular data that includes only a partial set of one or more such lines or other graphical features (e.g., tabular data that: is surrounded by an outer box/border but otherwise includes no lines, or includes lines separating columns but no lines separating rows, or includes an outer box/border and lines separating columns but no lines separating rows, or includes lines separating rows but no lines separating columns, or includes an outer box/border and lines separating rows but no lines separating columns, or includes lines separating only a subset of the columns and/or includes lines separating only a subset of the rows, or includes an outer box/border and lines separating only a subset of the columns and/or includes an outer box/border and lines separating only a subset of the rows). Table data can include words, letters, numbers, special characters, equations, etc.

Images that can include lineless tables and that are suitable for processing by systems and methods set forth herein can include one or more of the following, by way of example only: digital graphics files such as raster images (i.e., pixel-based images), vector graphics (i.e., graphics based on mathematical formulas defining geometric polygons such as polygons, lines, curves, circles and rectangles), raster graphics, bitmap images, bitmaps, dot matrix data structures, etc.

FIGS. 1A-1D are diagrams illustrating a method of detecting table structure for a lineless table, according to some embodiments. As shown in FIGS. 1A-1D, the lineless table 100A includes data arranged in rows and columns. Although the human eye can easily see macroscale and microscale patterns within such data, machines (i.e., compute devices) typically analyze data at too small a scale to detect those patterns. According to systems and methods set forth herein, given a table without horizontal and vertical lines (100A), or a table with partial horizontal and vertical lines, a generative adversarial network (which is a deep neural network architecture) can be developed and trained to predict all lines in the table based on the visual structure of the table. The table at 100B shows an example of predicted lines demarcating rows and columns, generated based on the data in table 100A and using the deep generative adversarial network. The lines can be isolated (at 100C) by removing the data appearing in the original lineless table 100A.

Figure 2:
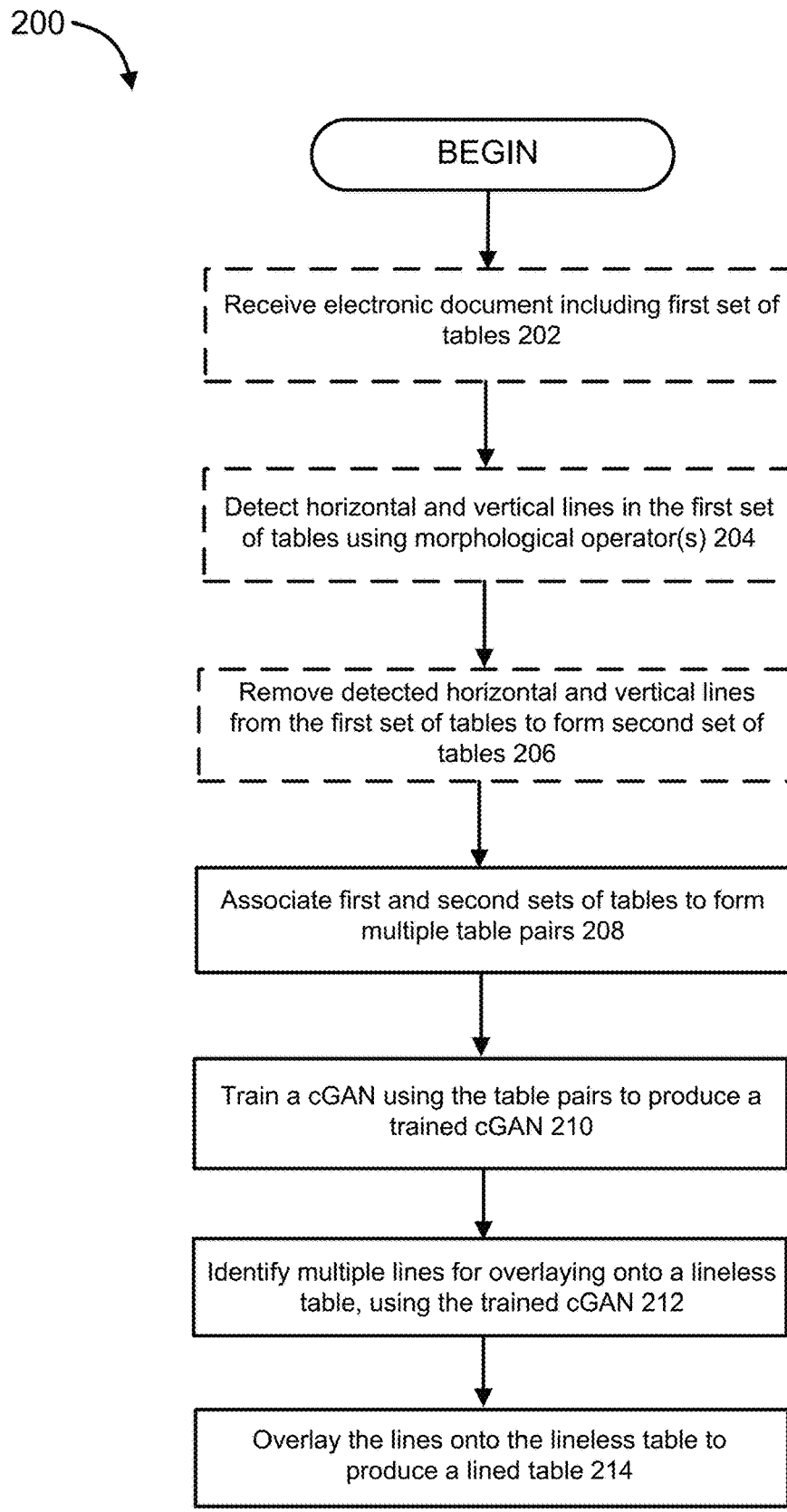
FIG. 2 is a flowchart illustrating an example method for converting a lineless table into a lined table, according to some embodiments.

FIG. 2 is a flowchart illustrating an example method for converting a lineless table into a lined table, according to some embodiments. As shown in FIG. 2, the method 200 optionally includes receiving, at 202 and via a processor, at least one electronic document including a first set of tables (e.g., including one or more tables in the form of image data). At 204, horizontal lines and vertical lines are detected in the first set of tables using at least one morphological operator, such as dilation and/or erosion. The detected horizontal lines and the detected vertical lines are removed from the first set of tables, at 206, to generate a second set of tables. The first set of tables is associated with the second set of tables at 208 to form multiple table pairs that include tables with lines and tables without lines. A conditional generative adversarial network (cGAN) is trained, at 210, using the plurality of table pairs, to produce a trained Cgan. The cGAN provides a framework for a supervised image-to-image translation. The cGAN includes a generative algorithm and a discriminative algorithm, and the discriminative algorithm is configured to authenticate, during the training phase/step, table pairs from the plurality of table pairs (i.e., a "ground truth") based on a predicted (lined) table produced by the generative algorithm. Multiple lines are identified at 212, using the trained cGAN, for overlaying onto a lineless table. The multiple lines are overlaid onto the lineless table at 214 to produce a lined table.

In some embodiments, the first set of tables includes one or more tables in the form of image data, and the method 200 of FIG. 2 also includes converting the table images into a binary (e.g., black-and-white) image based on an adaptive threshold method (e.g., Otsu's adaptive threshold method). In other embodiments, the cGAN includes a discriminative algorithm, and a modified version of the method 200 of FIG. 2 can also include calculating a quality metric via the discriminative algorithm based on an initial table from the first set of tables. In still other embodiments, the cGAN includes a discriminative algorithm, and a modified version of the method 200 of FIG. 2 can also include calculating a quality metric via the discriminative algorithm based on an initial table from the first set of tables. The quality metric is then passed as an input to a generative algorithm of the cGAN during the training of the cGAN. In still other embodiments, the cGAN includes a generative algorithm and a discriminative algorithm. The discriminative algorithm is configured to authenticate table pairs from the plurality of table pairs based on a predicted table produced by the generative algorithm. Each of the generative algorithm and the discriminative algorithm can include at least one convolutional neural network layer.

Figure 3:
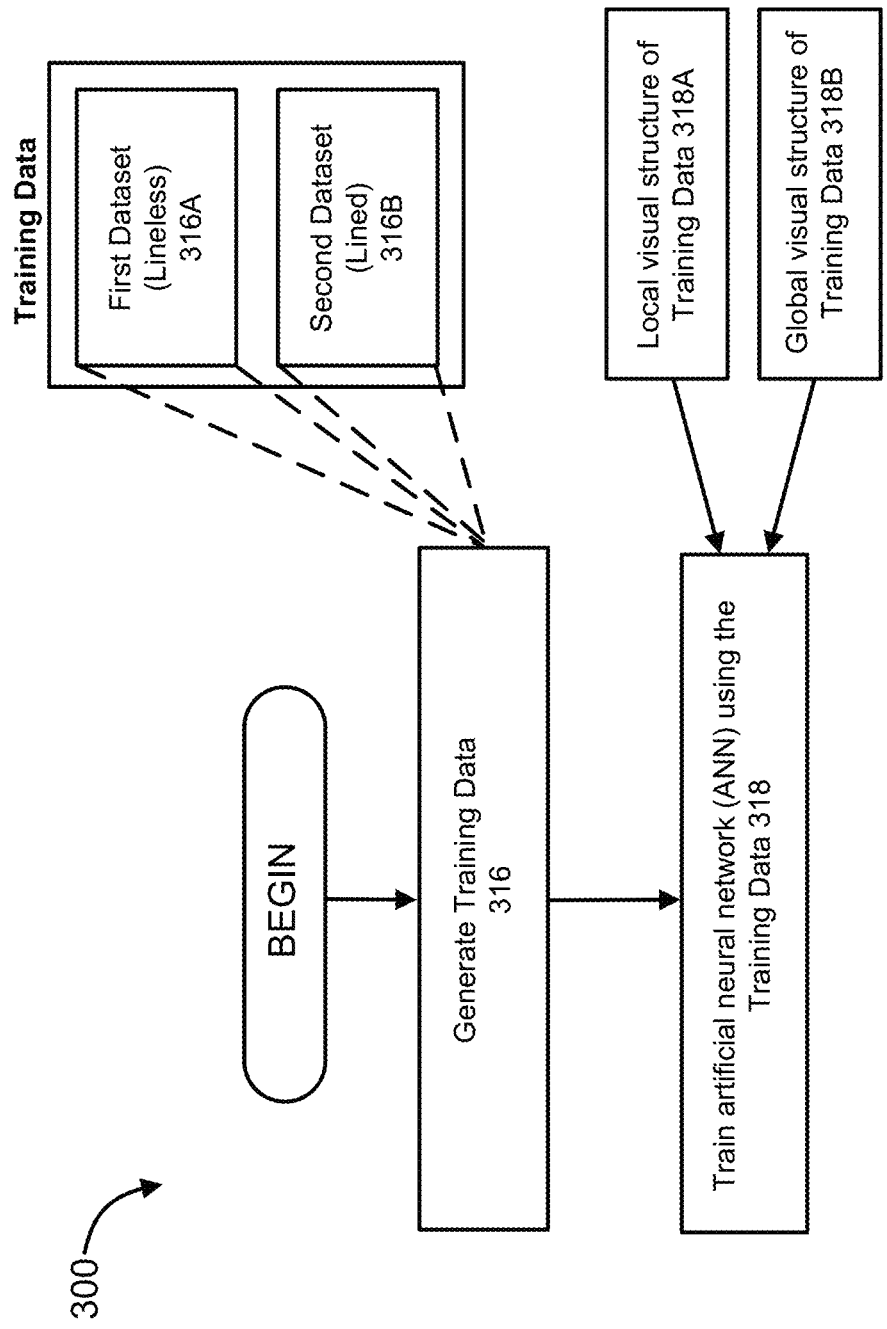
FIG. 3 is a flowchart illustrating an example method for training a machine learning model to convert a lineless table into a lined table, according to some embodiments.

FIG. 3 is a flowchart illustrating an example method for training a machine learning model to convert a lineless table into a lined table, according to some embodiments. As shown in FIG. 3, the method 300 includes generating training data, at 316 and via a processor. The training data includes a first dataset 316A including at least one lineless table, and a second dataset 316B including at least one lined table, the second dataset being associated with the first dataset. The first dataset 316A and the second dataset 316B collectively define training data. The method 300 also includes training an artificial neural network (ANN), at 318, based on a local visual structure 318A of the training data and a global visual structure 318B of the training data, to produce a trained ANN configured to predict line placement for a lineless table. The trained ANN can include a conditional generative adversarial network (cGAN), e.g., a supervised cGAN. Alternatively or in addition, the trained ANN can include at least one generative algorithm and at least one discriminative algorithm.

Figure 4:
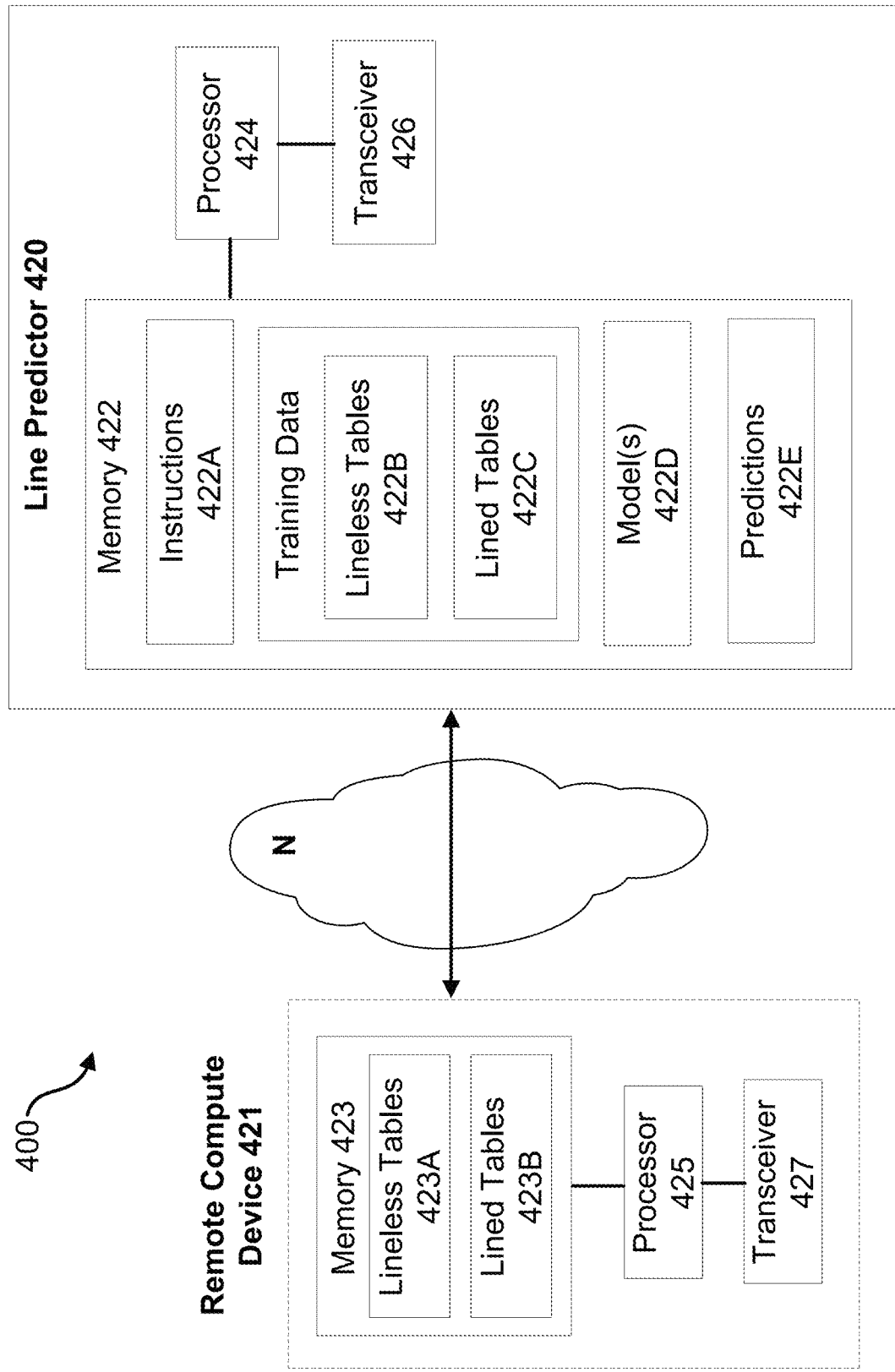
FIG. 4 is a flowchart illustrating an example system for converting a lineless table into a lined table, according to some embodiments, according to some embodiments.

FIG. 4 is a flowchart illustrating an example system for converting a lineless table into a lined table, according to some embodiments, according to some embodiments. As shown in FIG. 4, the system 400 includes a line predictor 420. The line predictor 420 includes a processor 424, a transceiver 426 (i.e., a transmitter and a receiver) operably coupled to the processor 424, and a memory 422 operably coupled to the processor 424. The memory 422 stores instructions 422A, executable by the processor to receive a first, lineless table (which may be stored in the memory 422 at 422B), and generate a second table that is a lined table (which may be stored in the memory 422 at 422C) based on the first table and using a trained neural network model (which may be stored in the memory 422 at 422D) that predicts line placement based on structural attributes of the first table. The predictions can be stored in the memory 422 at 422E. The trained neural network model can be a cGAN (e.g., including at least one convolutional neural network layer). Generating the second table can include determining at least one predicted line and superimposing the predicted line onto an image of the first table. The instructions 422A can include instructions executable by the processor 424 to send a signal (e.g., via the transceiver 426 and over a wired or wireless communications network "N") to cause display of the second table within a graphical user interface (GUI) of a user (e.g., of remote compute device 421 and/or of line predictor 420). The remote compute device 421 includes a memory 423, a processor 425 operably coupled to the memory 423, and a transceiver 427 operatively coupled to the processor 425. The memory 423 can store lineless tables 423A (which may also be sent to the line predictor 420, via the network N, for conversion into lined tables) and/or lined tables 423B (e.g., received from the line predictor 420 in response to sending a lineless table to the line predictor 420 for conversion into a lined table).

In some implementations, the trained neural network model stored at 422D is a cGAN that includes a multiresolution generative network and a multiresolution discriminative network. The structural attributes of the first table can include global visual structural attributes of the first table and local visual structural attributes of the first table. As used herein, a "local attribute" can refer, by way of example, to a short-range structural feature of the table (e.g., a relationship of a pixel to one or more other pixels in close proximity thereto (i.e., within the pixel's "neighborhood")), and a "global attribute" can refer, by way of example, to a longer-range structural feature of the table (e.g., a relationship of a pixel to one or more other pixels relatively remote or far from that pixel (i.e., not within the pixel's neighborhood)).

In some implementations, the trained neural network model stored at 422D is a cGAN that includes at least one convolutional neural network layer that includes an atrous convolutional neural network layer. The structural attributes of the first table can include at least one of global visual structural attributes of the first table or local visual structural attributes of the first table.

Figure 5C:
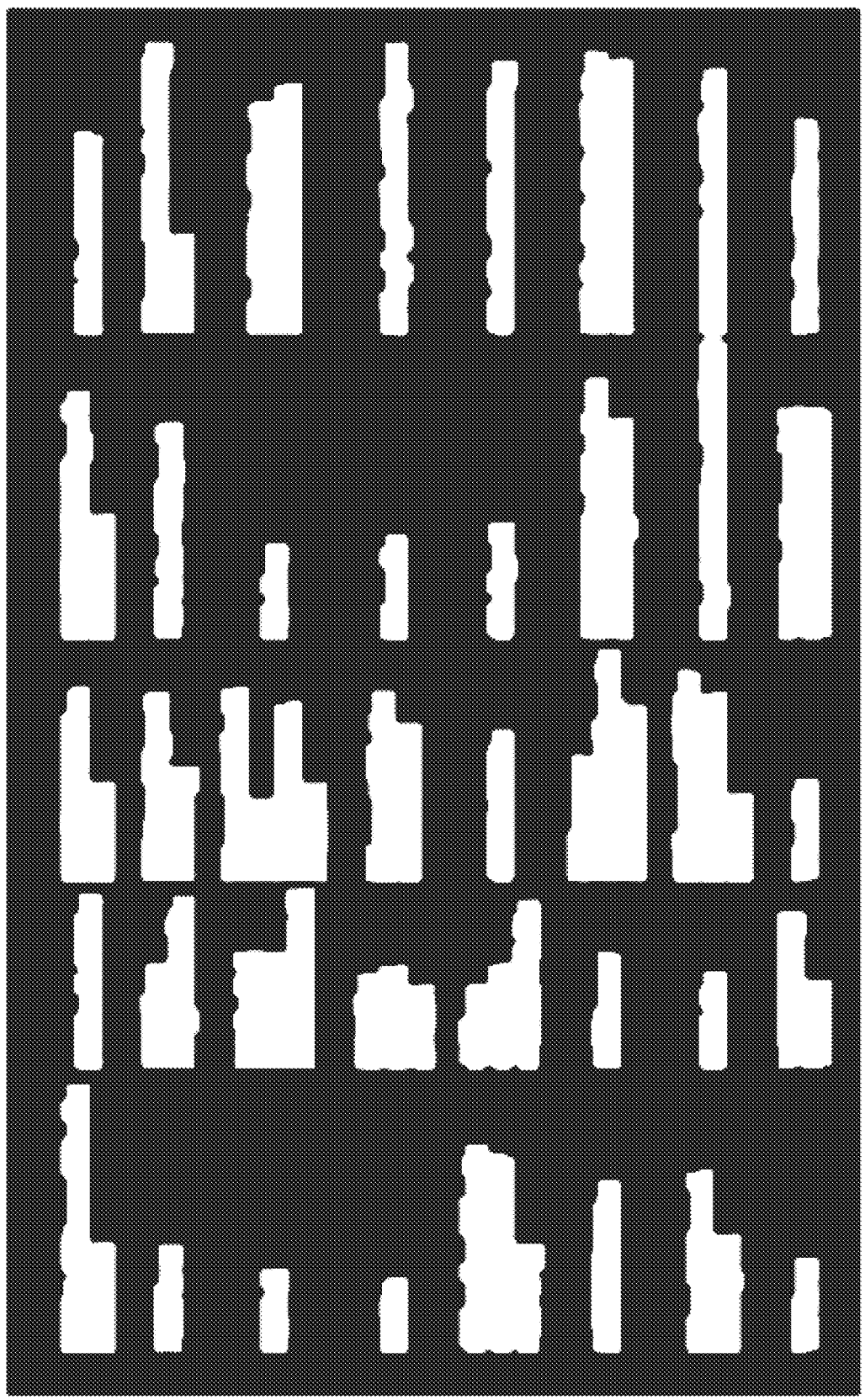

FIGS. 5A-5C are diagrams showing an inverted graphical representation of text regions of a lined and lineless table, according to some embodiments. Each of lined table 530A and lineless table 530B includes text within cells that can be readily distinguished/identified by the human eye. Each separate text region from the table is represented as a white region in graphic 530C. Without lines, known information extraction algorithms can fail to correctly identify table cells, particularly those with reduced separation between them (e.g., see the close texts in adjacent cells on rows 1, 2, 3, and columns 2, 3 of tables 530A and 530B). Methods set forth herein can generate predictions of the proper placement of vertical and horizontal lines in a table based on its overall visual structure, substantially improving the accuracy of row and column prediction for the table and thereby improving the performance of any subsequently-employed data extraction algorithm.

In some embodiments, an algorithm for predicting lines of a table based on a visual structure of the table includes a supervised image-to-image translation or an unsupervised image-to-image translation. Image-to-image translation can be used for one or more of: edge detection, semantic segmentation, conversion of images from black and white to color, day-to-night scene conversion (and vice versa), etc.

Figure 6:
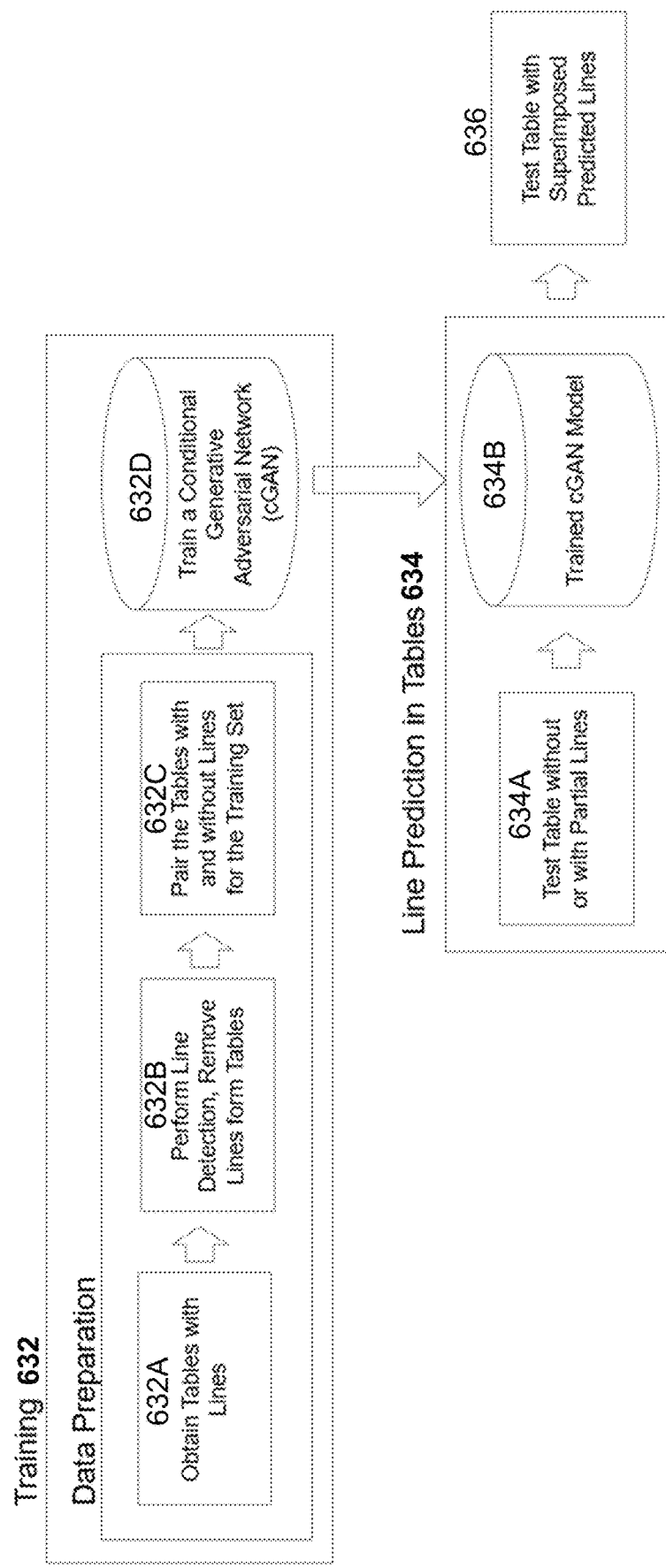
FIG. 6 is a flowchart illustrating an example method for training a Conditional Generative Adversarial Network (cGAN) and using the trained cGAN to convert a lineless table into a lined table, according to some embodiments.

FIG. 6 is a flowchart illustrating an example method for training a Conditional Generative Adversarial Network (cGAN) and using the trained cGAN to convert a lineless table into a lined table, according to some embodiments. As shown in FIG. 6, a training sequence 632 includes obtaining tables with lines at 632A, performing line detection on the lined tables and removing lines from the tables based on the line detection (at 632B), and pairing the tables with lines with their counterpart/corresponding lineless tables, at 632C, to form a training data set. Steps 632A-632C represent a data preparation sequence. An example code snippet illustrating a procedure for removing lines from a table using morphological operators is as follows:

```
In [1]:
import glob
import os
import sys
from matplotlib import pyplot as plt
%matplotlib inline
import cv2
import numpy as np
```

-continued

```
In [2]:
def dilate(ary, N, iterations):
    """Dilate using an NxN '+' sign shape. ary is np.uint8."""
    kernel = np.zeros((N,N), dtype=np.uint8)
    kernel[(N-1)//2,:] = 1
    dilated_image = cv2.dilate(ary / 255, kernel, iterations=iterations)
    dilated_image = cv2.dilate(ary, kernel, iterations=iterations)
        kernel = np.zeros((N,N), dtype=np.uint8)
        kernel[:,(N-1)//2] = 1
        dilated_image = cv2.dilate(dilated_image, kernel, iterations=iterations)
        return dilated_image
def crop_table(im):
    """Calculate bounding box for each contour."""
    gray = cv2.cvtColor(im, cv2.COLOR_BGR2GRAY)
    th, threshed = cv2.threshold(gray, 127, 255, cv2.THRESH_BINARY_INV | cv2.THRESH_OTSU)
pts = cv2.findNonZero(threshed)
rect = cv2.minAreaRect(pts)
(cx, cy), (w, h), ang = rect
print('width: { } and height: { }'.format(w, h))
crop_im = im[:int(h + 200),:int(w + 200),:]
return crop_im
def remove_lines(img):
gray = cv2.cvtColor(img, cv2.COLOR_BGR2GRAY)
th, thresh1 = cv2.threshold(gray, 127, 255, cv2.THRESH_OTSU)
th, thresh = cv2.threshold(gray, 127, 255, cv2.THRESH_BINARY_INV | cv2.THRESH_OTSU)
horizontal_img = thresh
vertical_img = thresh
kernel = cv2.getStructuringElement(cv2.MORPH_RECT, (100,1))
horizontal_img = cv2.erode(horizontal_img, kernel, iterations=1)
horizontal_img = cv2.dilate(horizontal_img, kernel, iterations=1)
kernel = cv2.getStructuringElement(cv2.MORPH_RECT, (1,100))
vertical_img = cv2.erode(vertical_img, kernel, iterations=1)
vertical_img = cv2.dilate(vertical_img, kernel, iterations=1)
mask_img = horizontal_img + vertical_img
no_line = np.bitwise_or(thresh1, mask_img)
return no_line
in [3]:
img_dir = "./tables/originalTest1" # Enter Directory of all images
data_path = os.path.join(img_dir, "*.jpg")
files = glob.glob(data_path)
In [4]:
count = 0
for f1 in files:
count += 1
print('\n')
print('file no.: { }, filename: { }'.format(count, f1))
im = cv2.imread(f1)
crop_im = crop_table(im)
image = remove_lines(crop_im)
IMAGE_SIZE = (24,16)
plt.figure(figsize = IMAGE_SIZE)
plt.imshow(im, cmap = 'gray')
plt.title('Original Image')#, plt.xticks([ ]), plt.yticks([ ])
plt.show( )
plt.figure(figsize = IMAGE_SIZE)
plt.imshow(crop_im, cmap = 'gray')
plt.title('Cropped Image')#, plt.xticks([ ]), plt.yticks([ ])
plt.show( )
plt.figure(figsize = IMAGE_SIZE)
plt.imshow(image, cmap = 'gray')
plt.title('Table without Lines')#, plt.xticks([ ]), plt.yticks([ ])
plt.show( )
```

The training data set, generated at 632C, is used to train a cGAN, at 632D, thereby producing a trained cGAN 634B. During line prediction in tables 634, a test table without lines or with partial lines, 634A, is provided to the trained cGAN model 634B, which generates predicted lines for the test table. The predicted lines are superimposed (e.g., within the same step) onto the test table to produce a version of the test table with superimposed predicted lines 636.

Figure 7:
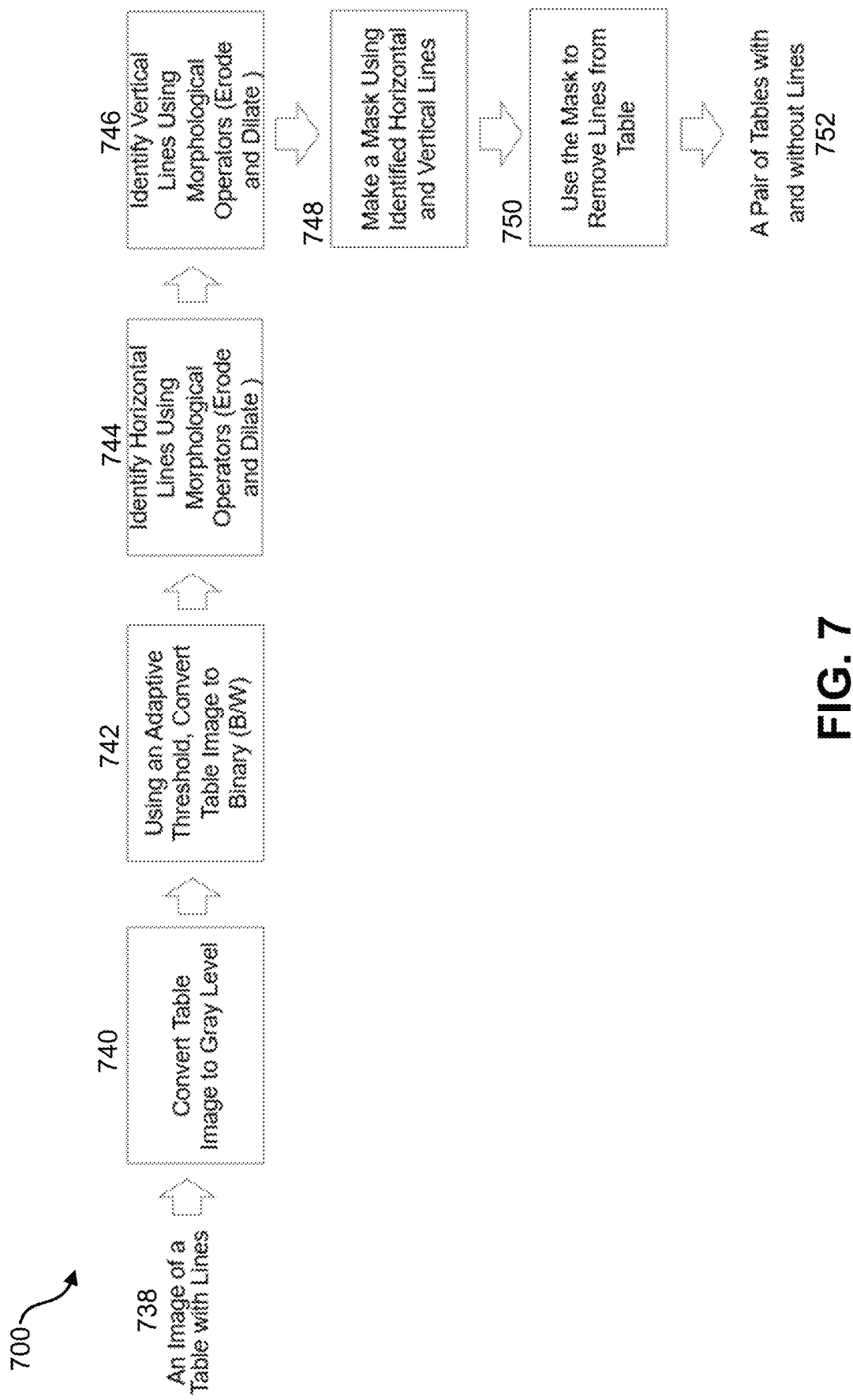
FIG. 7 is a flowchart illustrating an example method for removing lines from a table, according to some embodiments.

FIG. 7 is a flowchart illustrating an example method for removing lines from a table, according to some embodiments. As shown in FIG. 7, the method 700 begins upon receipt of an input image file that includes a lined table 738. During the method 700, the lined table is converted to grayscale (or "gray level") at 740, and then converted, at 742 and using an adaptive threshold, into a binary format (e.g., black and white). Based on the binary format data, and using erosion and dilation morphological operators, horizontal lines are detected/identified at 744 and vertical lines are detected/identified at 746. A mask is generated, at 748, using the identified horizontal lines and vertical lines, and the mask is used, at 750, to remove lines from the table, thereby producing a lineless table. Upon completion of the method

700, a pair of tables 752 is output, the pair of tables 752 including the lined table and the lineless table.

Figure 8:
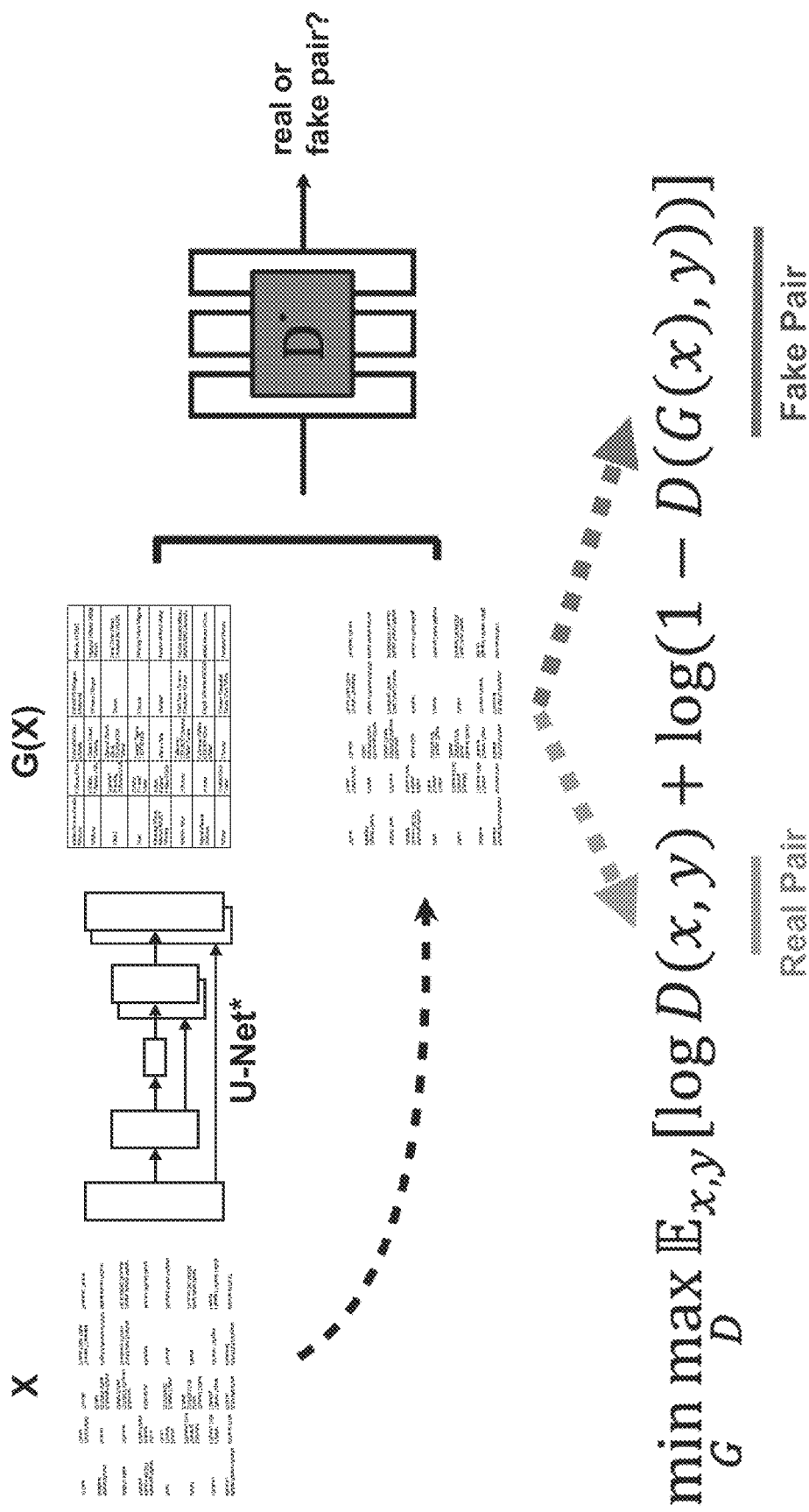
FIG. 8 is a diagram showing an architecture of a cGAN-based training system, according to some embodiments.

FIG. 8 is a diagram showing an architecture of a cGAN-based training system, according to some embodiments. As shown in FIG. 8, an initial lineless table X is converted into a lined table G(X) using a generative network encoder/decoder (U-Net). Both the lineless table X and the lined table G(X) (i.e., a table pair) are sent to a discriminative network (D) to determine whether the table pair is a real pair or a fake pair, for example according to the equation shown in FIG. 8 (in which y=ground truth and $E_{x,y}$ is the joint expectation function). Both the U-Net and D are designed in multiresolution, for example using atrous convolution. Atrous convolution can provide a larger field of view (or "receptive field") by providing holes in the kernel, thereby enlarging the size of the kernel without increasing the computational cost. By inserting an increasing number of holes into the kernel, the field of view can be expanded, facilitating a larger-scale view (e.g., including more global structures). Atrous convolution thus facilitates multiresolution analysis, accounting for both global and local structure/visual context of tables.

FIGS. 9A-9C are diagrams showing a first example set of results from converting a lineless table into a lined table, according to some embodiments. The leftmost column, labeled "Input," shows an input lineless table. The center column, labeled "Output," shows a lined table produced by overlaying/superimposing predicted lines (generated using a trained cGAN, for example, as described above in connection with FIGS. 2 and 6) onto the input lineless table. The rightmost column, labeled "Ground Truth," shows the intended table structure (i.e., the proper/intended placement of lines for the input lineless table). FIGS. 10A-10C are diagrams showing a second example set of results from converting a lineless table into a lined table, organized in a manner similar to that of FIGS. 9A-9C, according to some embodiments.

All combinations of the foregoing concepts and additional concepts discussed herewithin (provided such concepts are not mutually inconsistent) are contemplated as being part of the subject matter disclosed herein. The terminology explicitly employed herein that also may appear in any disclosure incorporated by reference should be accorded a meaning most consistent with the particular concepts disclosed herein.

The drawings primarily are for illustrative purposes and are not intended to limit the scope of the subject matter described herein. The drawings are not necessarily to scale; in some instances, various aspects of the subject matter disclosed herein may be shown exaggerated or enlarged in the drawings to facilitate an understanding of different features. In the drawings, like reference characters generally refer to like features (e.g., functionally similar and/or structurally similar elements).

To address various issues and advance the art, the entirety of this application (including the Cover Page, Title, Headings, Background, Summary, Brief Description of the Drawings, Detailed Description, Embodiments, Abstract, Figures, Appendices, and otherwise) shows, by way of illustration, various embodiments in which the embodiments may be practiced. The advantages and features of the application are of a representative sample of embodiments only, and are not exhaustive and/or exclusive. They are presented to assist in understanding and teach the embodiments.

The embodiments set forth herein are not representative of all embodiments. As such, certain aspects of the disclosure have not been discussed herein. That alternate embodiments may not have been presented for a specific portion of the innovations or that further undescribed alternate embodiments may be available for a portion is not to be considered to exclude such alternate embodiments from the scope of the disclosure. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure.

Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure.

Various concepts may be embodied as one or more methods, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments. Put differently, it is to be understood that such features may not necessarily be limited to a particular order of execution, but rather, any number of threads, processes, services, servers, and/or the like that may execute serially, asynchronously, concurrently, in parallel, simultaneously, synchronously, and/or the like in a manner consistent with the disclosure. As such, some of these features may be mutually contradictory, in that they cannot be simultaneously present in a single embodiment. Similarly, some features are applicable to one aspect of the innovations, and inapplicable to others.

In addition, the disclosure may include other innovations not presently described. As such, it should be understood that advantages, embodiments, examples, functional, features, logical, operational, organizational, structural, topological, and/or other aspects of the disclosure are not to be considered limitations on the disclosure as defined by the embodiments or limitations on equivalents to the embodiments. Depending on the particular desires and/or characteristics of an individual and/or enterprise user, database configuration and/or relational model, data type, data transmission and/or network framework, syntax structure, and/or the like, various embodiments of the technology disclosed herein may be implemented in a manner that enables a great deal of flexibility and customization as described herein.

All definitions, as defined and used herein, should be understood to control over dictionary definitions, definitions in documents incorporated by reference, and/or ordinary meanings of the defined terms.

As used herein, in particular embodiments, the terms "about" or "approximately" when preceding a numerical value indicates the value plus or minus a range of 10%. Where a range of values is provided, it is understood that each intervening value, to the tenth of the unit of the lower limit unless the context clearly dictates otherwise, between the upper and lower limit of that range and any other stated or intervening value in that stated range is encompassed within the disclosure. That the upper and lower limits of these smaller ranges can independently be included in the smaller ranges is also encompassed within the disclosure, subject to any specifically excluded limit in the stated range. Where the stated range includes one or both of the limits, ranges excluding either or both of those included limits are also included in the disclosure.

The indefinite articles "a" and "an," as used herein in the specification and in the embodiments, unless clearly indicated to the contrary, should be understood to mean "at least one."

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the embodiments, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the embodiments, shall have its ordinary meaning as used in the field of patent law.

As used herein in the specification and in the embodiments, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the embodiments, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

While specific embodiments of the present disclosure have been outlined above, many alternatives, modifications, and variations will be apparent to those skilled in the art. Accordingly, the embodiments set forth herein are intended to be illustrative, not limiting. Various changes may be made without departing from the scope of the disclosure.

The invention claimed is:

1. A processor-implemented method, comprising:
removing, using a mask, at least some lines from a first set of tables to generate a second set of tables;
calculating a quality metric via a discriminative algorithm included in a conditional generative adversarial network (cGAN) based on an initial table from the first set of tables;
training the cGAN, using the first set of tables and the second set of tables, to produce a trained cGAN, the quality metric being passed as an input to a generative algorithm of the cGAN during the training of the cGAN;
identifying, using the trained cGAN, a plurality of lines for overlaying onto a lineless table; and
overlaying the plurality of lines onto the lineless table to produce a lined table.

2. The processor-implemented method of claim 1, wherein the first set of tables includes a plurality of table images.

3. The processor-implemented method of claim 1, wherein the first set of tables includes a plurality of table images, the method further comprising:
converting the plurality of table images into a binary format based on an adaptive threshold.

4. The processor-implemented method of claim 1, wherein the cGAN is a supervised GAN.

5. The processor-implemented method of claim 1, wherein the discriminative algorithm is configured to authenticate table pairs from the first set of tables and the second set of tables based on a predicted table produced by the generative algorithm.

6. The processor-implemented method of claim 1, wherein:
the discriminative algorithm is configured to authenticate table pairs from the first set of tables and the second set of tables based on a predicted table produced by the generative algorithm, and
each of the generative algorithm and the discriminative algorithm includes at least one convolutional neural network layer.

7. A processor-implemented method, comprising:
generating training data, via a processor, the training data including:
a first dataset including at least one of lineless formatted data or partially lined formatted data, and a second dataset including formatted data with format lines, at least some of the format lines from the second dataset removed using a mask to generate the first dataset; and training an artificial neural network (ANN) that includes a generative algorithm and a discriminative algorithm using the training data based on a local visual structure of the training data and a global visual structure of the training data, to produce a trained ANN configured to predict line placement for at least one of a lineless table or a partially lined table, the discriminative algorithm configured to authenticate table pairs from the first dataset and the second dataset based on a predicted table produced by the generative algorithm.

8. The method of claim 7, wherein the ANN is a conditional generative adversarial network (cGAN).

9. The processor-implemented method of claim 7, wherein:
the ANN is a conditional generative adversarial network (cGAN),
the cGAN is a supervised GAN.

10. The processor-implemented method of claim 7, wherein the training the ANN includes generating the predicted table based on the first dataset and the second dataset.

11. A system, comprising:
a processor; and
a memory storing instructions executable by the processor to:
receive a first table that is one of a lineless table or a partially lined table; and
generate a second table that is a lined table based on the first table and using a trained neural network model that predicts line placement based on structural attributes of the first table, the trained neural network trained using tables with lines and tables without lines, at least some lines from the tables with lines removed using a mask to generate the tables without lines, the trained neural network including a generative algorithm and a discriminative algorithm, the discriminative algorithm configured to authenticate table pairs from the tables with lines and the tables without lines based on a predicted table produced by the generative algorithm.

12. The system of claim 11, wherein generating the tables without lines from the tables with lines includes modifying a color of the tables with lines prior to using the mask.

13. The system of claim 11, wherein the generating the second table includes determining at least one predicted line and superimposing the predicted line onto an image of the first table.

14. The system of claim 11, wherein the memory further stores instructions executable by the processor to send a signal to cause display of the second table within a graphical user interface (GUI).

15. The system of claim 11, wherein:
the trained neural network model is a cGAN; and
the structural attributes of the first table include global visual structural attributes of the first table and local visual structural attributes of the first table.

16. The system of claim 11, wherein:
the trained neural network model is a cGAN that includes at least one convolutional neural network layer.

17. The system of claim 11, wherein:
the trained neural network model is a cGAN that includes at least one convolutional neural network layer,
the at least one convolutional neural network layer includes an atrous convolutional neural network layer, and
the structural attributes of the first table include at least one of global visual structural attributes of the first table or local visual structural attributes of the first table.

* * * * *

UNITED STATES PATENT AND TRADEMARK OFFICE
CERTIFICATE OF CORRECTION

PATENT NO. : 11,915,465 B2
APPLICATION NO. : 16/546938
DATED : February 27, 2024
INVENTOR(S) : Mehrdad Jabbarzadeh Gangeh et al.

Page 1 of 1

It is certified that error appears in the above-identified patent and that said Letters Patent is hereby corrected as shown below:

In the Claims

At Column 13, Line 35 (Claim 11, Line 11): "trained using tables with lines and tables without" should read -- model trained using tables with lines and tables without --

At Column 14, Line 1 (Claim 11, Line 14): "lines, the trained neural network including a genera-" should read -- lines, the trained neural network model including a genera- --

At Column 14, Line 12 (Claim 13, Line 3): "and superimposing the predicted line onto an image of the" should read -- and superimposing the at least one predicted line onto an image of the --

Signed and Sealed this
Seventeenth Day of June, 2025

Coke Morgan Stewart
*Acting Director of the United States Patent and Trademark Office*